March 12, 1940.  A. A. GUARINO  2,193,358
TRAP
Filed April 26, 1939

Inventor
Arthur A. Guarino.

By Clarence A. O'Brien
and Hyman Berman
Attorneys

Patented Mar. 12, 1940

2,193,358

UNITED STATES PATENT OFFICE 2,193,358

TRAP

Arthur A. Guarino, Jeffersonville, N. Y.

Application April 26, 1939, Serial No. 270,236

2 Claims. (Cl. 43—81)

The present invention relates to new and useful improvements in traps of the swinging wire jaw type and has for its primary object to provide, in a manner as hereinafter set forth, a device of this character which is adapted to catch either rats or mice.

Another very important object of the invention is to provide, in a trap comprising an outer jaw and a comparatively small spring actuated inner jaw, novel means for operatively connecting said outer jaw to said inner jaw for actuation thereby.

Other objects of the invention are to provide a combination rat and mouse trap of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
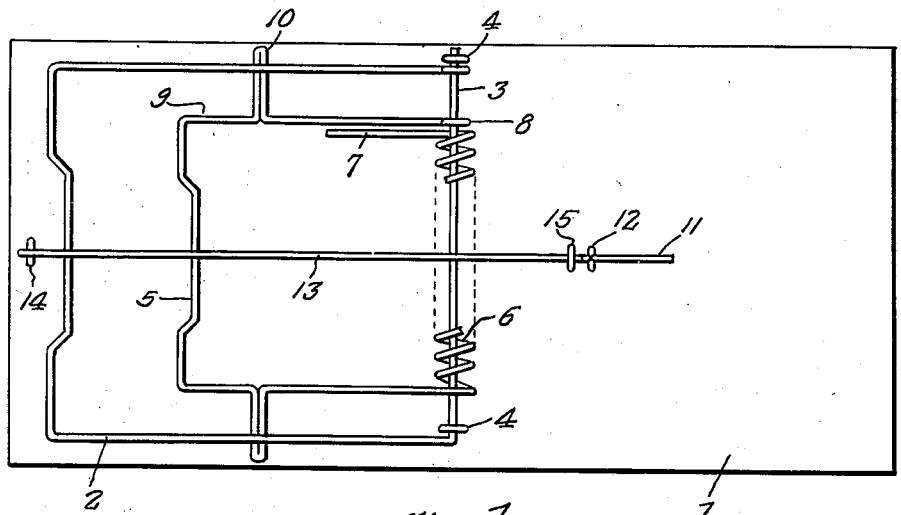
Figure 1 is a top plan view of a combination rat and mouse trap constructed in accordance with the present invention, showing the jaws set.
Figure 2:
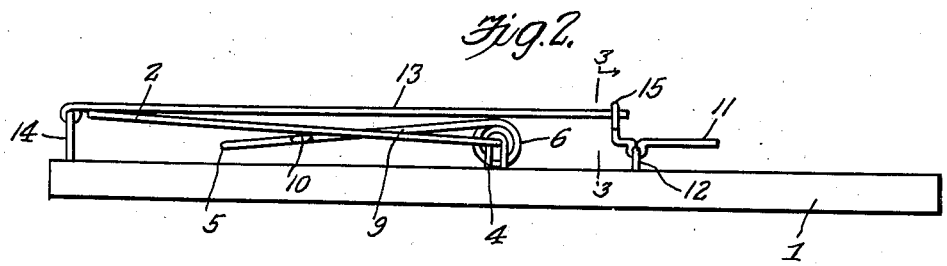
Figure 2 is a view in side elevation thereof.
Figure 3:
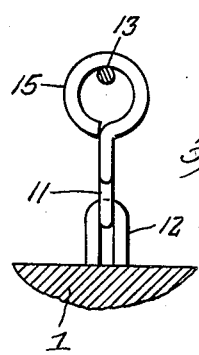
Figure 3 is a detail view in cross section, taken substantially on the line 3—3 of Fig. 2.

Referring now to the drawing in detail, it will be seen that the embodiment of the invention which has been illustrated comprises a substantially rectangular base 1 of suitable material, preferably wood, said base being of any desired dimensions. Mounted for swinging movement in a vertical plane on the base 1 is an outer jaw 2 of wire. The jaw 2 is formed to provide a transverse shaft 3 which is journaled in staples 4 on the base 1.

Mounted for swinging movement in a vertical plane on the shaft 3 is a comparatively small, substantially U-shaped inner jaw 5 which is also of wire. Formed integrally with one end of the inner jaw 5 is a coil spring 6 which encircles the shaft 3. The coil spring 6 terminates, at one end, in an arm 7 which is engaged with the base 1 under tension. At its other end, the jaw 5 terminates in an eye 8 which is journaled on the shaft 3. At intermediate points, the legs 9 of the jaw 5 are bent outwardly and then inwardly in a manner to provide arms 10 which are engageable with the outer jaw 2 for operatively connecting said outer jaw to the inner jaw for actuation thereby.

The reference numeral 11 designates a trigger which is pivotally mounted on a staple 12 on the base 1 forwardly of the shaft 3. A latch rod 13 has one end loosely connected to a staple 14 on the rear end of the base 1. The free end of the latch rod 13 is engageable in an eye 15 which is provided therefor on one end of the trigger 11. Of course, the bait is impaled on the trigger 11.

It is thought that the operation of the trap will be readily apparent from a consideration of the foregoing. The jaws 2 and 5 are swung upwardly, rearwardly and downwardly to set position on the rear of the base 1 against the tension of the coil spring 6. The latch rod 13 extends longitudinally over the jaws 2 and 5 and is engaged in the eye 15 of the trigger 11 for securing said jaws in set position. When the trigger 11 is depressed, as by a rat or mouse attempting to get the bait thereon, the rod 13 is released thereby releasing the jaws 2 and 5 to be actuated by the spring 6. Of course, the inner jaw 5 is adapted to catch mice while the comparatively large outer jaw 2 is adapted to catch rats. It will be observed that the construction and arrangement is such that the spring 6 is adapted to actuate both jaws.

It is believed that the many advantages of a combination rat and mouse trap constructed in accordance with the present invention will be readily understood and although a preferred embodiment of the device is illustrated and described, it is to be understood that changes in the details of construction and in the combination and arrangement of parts may be resorted to which will fall within the scope of the invention as claimed.

What is claimed is:

1. A trap of the character described comprising a base, an outer jaw mounted for swinging movement on said base, a comparatively small inner jaw mounted for swinging movement on the base, a spring operatively connected to the inner jaw for actuating same, arms projecting laterally from the inner jaw and engageable with the outer jaw for connecting said outer jaw to said inner jaw for actuation thereby, and trigger means on the base common to the outer and inner jaws for releasably securing said jaws in set position.

2. A trap of the character described comprising a base, an outer jaw including a transverse shaft journaled on said base, a comparatively small inner jaw mounted for swinging movement on the shaft, said inner jaw including an actuating coil spring encircling the shaft, an arm on one end of the coil spring engaged with the base under tension, arms projecting laterally from the inner jaw and engaged with the outer jaw for operatively connecting said outer jaw to said inner jaw for actuation thereby, and trigger means on the base for releasably securing the jaws in set position.

ARTHUR A. GUARINO.